3,287,422
ONE-STEP PROCESS OF ACID ACTIVATING MINERAL CLAYS AND ALKYLATING PHENOLIC COMPOUNDS IN THE PRESENCE OF AN ALKENE HYDROCARBON

Harry Kaplan, Westfield, N.J., assignor to General Aniline & Film Corporation, New York, N.Y., a corporation of Delaware
No Drawing. Filed Dec. 29, 1961, Ser. No. 163,045
9 Claims. (Cl. 260—624)

The present invention relates to a one-step process of acid activating a mineral clay of the alumina-silica type in the presence of an alkene hydrocarbon and alkylating a phenolic compound with the said hydrocarbon and acid activated clay.

The alkylation of phenolic compounds by several methods is well known. Several substances and mixtures of such substances have been proposed as alkylation catalyst such as, for example, sulfuric acid, phosphoric acid, hydrofluoric acid, metal phosphates, and particularly acid clays of various types. Of commercial interest are alkylated phenols which are ethoxylated and used in the manufacture of surface active agents. The alkylated phenolic compounds prepared in accordance with the present commercially acceptable procedure are obtained while employing olefinic hydrocarbons as the alkylating agents in the presence of acid clays, especially acid-activated montmorillonite types. The acid activation or acid pre-treatment is usually effected by but not necessarily restricted to known processes such as are employed in the manufacture of decolorizing clays. Normally, the acid treatment (cold) is carried out on the mineral montmorillonite (bentonite), an aluminum hydrosilicate, in finely divided form while the mineral clay is suspended in water in the form of a slurry to which mineral acid such as hydrochloric or sulfuric acid is added or dilute mineral acid added directly to the finely divided mineral clay. In either case, the weight ratio of cold acid to dry mineral clay may vary from about 20 to 100% based on the anhydrous basis but preferably the ratio is in the order of 30–40%. The mixture of the mineral clay and acid is heated to about 160 to 210° F. for a period of time ranging from 2 to 12 hours and thereafter water washed and filtered. Acid treatments of montmorillonite types of clay are described in United States Patents 1,397,113; 1,579,326; 1,642,871 and many others too numerous to mention, all of which are known to those skilled in the art. The acid treated clay, after drying in any known or desired manner, is then formed into aggregate masses such as by granulating, powdering, molding, extruding and the like and utilized as catalysts in the alkylation of phenols with olefinic hydrocarbons.

The solid type acid clay catalyst generally employed in the alkylation of phenolic compounds, while utilizing olefinic hydrocarbons as the alkylating agents, is activated bentonite catalyst in powder form, produced by acid treatment of the montmorillonite type mineral. The mineral montmorillonite, known commercially as bentonite, is best described by the following excerpts from "The Chemistry and Physics of Clays," by A. B. Searle and R. W. Grimshaw (Interscience Publishers, Inc.):

"Montmorillonite is the name given to a clay mineral found near Montmorillon in France as long ago as 1874. Essentially it has the composition $$Al_2O_3 \cdot 4SiO_2 \cdot H_2O + xH_2O$$

and is of exceptional stickiness. Many other minerals of similar properties yet with widely differing chemical composition have since been discovered.

"X-ray analyses have established the structural similarities and it is now known that extensive substitution and replacements can take place within the lattice.

"A wide range of minerals exists which might be included in the 'montmorillonite group,' but the term montmorillonite now has a more restricted meaning, and implies a compound which is essentially a hydrated aluminosilicate with only little substitution.

"Many clays which contain montmorillonite type minerals have been termed bentonite. The name has become common usage for commercial grades of montmorillonites."

The naturally occurring aluminum hydrosilicates of the montmorillonite type which have been subjected to a cold acid treating process are currently employed as catalysts for the alkylation of phenolic compounds because of their high ion exchange capacity at low reaction temperatures. Because of the high activity of these phenol alkylation catalysts a conversion of 90% is achieved even at temperatures between 70 and 90° C. while employing olefinic hydrocarbons from 9 to 12 carbon atoms. With di-monoolefin such as di-n-butenes, temperatures between 100 and 130° C. may be employed with satisfactory results. With shorter carbon chain olefins such as butene, high temperatures such as 150° C. may be required.

It is the principal object of the present invention to provide a simplified one-step process whereby any raw clay of the silica-alumina type is activated with sulfuric acid in the presence of an alkene hydrocarbon, i.e., monoolefinic hydrocarbon of from 3 to 18 carbon atoms to form the desired catalyst after a suitable period of contact and the catalyst employed in the alkylation of phenolic compounds without the necessity of separating and drying the catalyst and recovering the alkene hydrocarbon.

Other objects and advantages will become more clearly manifest from the following description.

I have discovered that any clay of the silica-alumina type is economically and efficiently transformed into an active catalyst by treating the clay in suspension of the alkylating medium, i.e., alkene hydrocarbon, by means of sulfuric acid. After a suitable period of contact with the acid, the catalyst formed is allowed to remain in suspension of the alkene hydrocarbon and employed directly in the alkylation of a phenolic compound in accordance with conventional procedure to give substantially high yields of the alkylated phenol.

As raw clays of the silica-alumina type, I can employ bentonite, montmorillonite, synthetic absorbent composites of silica-alumina, fuller's earth, and all of the other similar clays commercially available under various brand names. The raw clay is suspended with good agitation in the alkene hydrocarbon, concentrated sulfuric acid is added, and after a suitable period of contact, a phenolic compound is added to the catalyst thus formed and the alkylation reaction conducted in the usual manner. It is to be noted that the proportion of any of the raw clays of the silica-alumina type is limited only by the consideration of the obtainment of a freely moving suspension and may vary from 1 to as much as 1,000 parts by weight of the alkene hydrocarbon per part by weight of the raw clay of the silica-alumina type. My preference, however, is to employ from 10 to 50 parts by weight of the raw clay of the silica-alumina type to 100 to 300 parts by weight of the alkene hydrocarbon. The sulfuric acid employed may vary from 50 to 100% concentration and may be employed in an amount ranging from 1 to 50 parts by weight of such acid per 100 parts by weight of the raw clay. In the case where sulfuric acid of 100% concentration is employed, I prefer to employ the latter in an amount ranging from 1 part to 30 parts by weight per 100 parts by weight of clay. The temperature during the contact time of the raw clay with the acid suspended in the alkene hydrocarbon may range from subzero temperatures, through ambient temperatures, to as high as the boiling point of the alkene hydrocarbon. In large scale operational procedures I prefer, however, to operate at a temperature in the range from 20° to 100° C. The contact time in general averages from ½ to 5 hours at a temperature range of 30° to 60° C. The higher the temperature, the shorter the contact time.

After the raw clay has been acid activated, i.e. converted to a catalyst, a phenolic compound is added directly to the suspension and the required alkylation conducted in the conventional manner. I prefer, however, that the suspension of the acid activated clay be mainatined between a temperature ranging from 60 to 120° C. so as to facilitate the alkylation.

As examples of alkene hydrocarbons which may be employed as the suspending medium in the activation with silica-alumina of the raw clay and as the alkylating medium, the following are illustrative: propylene, dipropylene, butylene, isobutylene, diisobutylene, pentene, hexene, octene, nonene, decene, undecene, dodecene, octadecene, and the like.

The phenolic compounds which may be alkylated while employing the suspension of the acid activated clay in the alkene hydrocarbon include phenol per se, o-, m- and p-cresol, 2,4-xylenol, α-, and β-naphthol, 5-anthrol, 2-pyrocatechol, resorcinol, pyrogallol, pheloroglucinol, 1,2-dihydroxynaphthalene and the like.

In the actual alkylation of the phenolic compound it is desirable that the vessel in which the acid activation of the raw clay was conducted be charged with the phenolic compound in a ratio so that there is present 1 mole of phenolic compound to each mole of the alkene hydrocarbon. If it is desired, the molar ratio of the alkene hydrocarbon may be either in excess of or deficient to that of the phenolic compound. The mixture is then heated at a temperature of 70–150° C. depending upon the number of carbon atoms in the alkene hydrocarbon, preferably at lower temperatures in the event longer carbon chain alkenes have been employed during acid activation of the raw clay in the alkene hydrocarbon suspension.

For the purpose of the present invention, I prefer to use any raw clay of the silica-alumina type (which includes montmorillonite), the analysis of which, calculated on the volatile free basis, shows the following constituents:

| | Percent |
|---|---|
| Silica ($SiO_2$) | From 60–74.0 |
| Aluminum oxide ($Al_2O_3$) | From 12–22 |
| Ferric oxide ($Fe_2O_3$) | From 1.5–5.0 |
| Magnesium oxide (MgO) | From 1.0–7.0 |
| Calcium oxide (CaO) | From 0.25–3.0 |

Raw clays which conform to the foregoing analysis are commercially available and are obtained under several brand names such as, for example, Pike's Peak (montmorillonite clay), subbentonite from Cheto mine in Arizona, Wyo-Ben from Wyoming bentonite, Aquagel from Baroid Division of National Lead, Volclay from American Colloid Co., Panther Creek bentonite from American Colloid Co., etc.

For a further and more specific understanding of the present invention, reference is given to the following examples. All parts given are by weight.

EXAMPLE I

A 1-liter 3-necked flask equipped with agitator, thermometer, and a water-cooled reflux condenser was charged with 250 parts of nonene and 20 parts of #49 bentonite clay 200 mesh obtained from Whittaker Clark & Daniels. The mixture was agitated to yield a freely moving suspension and thereafter 1 part of 60% sulfuric acid added. The resulting mixture was agitated for 3 hours at 60° and thereafter 235 parts of phenol added. The agitation was continued for 2 hours allowing the temperature to rise to 90° C. The acid clay catalyst was removed by centrifuging and the resulting liquid subjected to distillation at 10 mm. pressure through a laboratory Vigreaux column to yield 41 parts of phenol and the distillation continued at 10 mm. pressure through the same column to yield 406 parts of nonylphenol distilling over the range of 159–181° C. at 10 mm. and having a refractive index of $n_D^{25}=1.5110$. Yield: 93% of theory.

EXAMPLE I-A

In order to determine the increase in yields of the alkylated product by the process of Example I, a similar alkylation was conducted with the exception that an acid activated clay catalyst of the montmorillonite type obtained commercially under the brand name of KSF (Sud Chemie, Germany) was employed in accordance with the following procedure:

To a 2-liter, 3-necked flask equipped with an agitator, thermometer, and a water-cooled reflux condenser there were charged 250 parts of nonene, 235 parts of phenol, and 20 parts of catalyst KSF and the free-flowing suspension agitated for 2 hours at 90° C. The catalyst was removed by filtration. 480 parts of the filtrate were distilled at 10 mm. pressure through a laboratory Vigreaux column to yield 340 parts of nonylphenol distilling over the range of 159–181° C. at 10 mm. and having a refractive index of $n_D^{25}=1.5110$. Yield: 78% of theory.

EXAMPLE I-B

In order to determine further the increase in yield of the alkylated product by the process of Example I, a similar alkylation was conducted corresponding to Example I-A. In this instance the reactants were 250 parts of nonene, 235 parts of phenol, and 20 parts of #49 bentonite (Whittaker Clark & Daniels). Reaction time was 2 hours at a temperature of 90° C. Yield of nonylphenol: 1% of theory.

EXAMPLE II

A 1-liter 3-necked flask equipped with agitator, thermometer, and a water-cooled reflux condenser was charged with 224 parts diisobutylene and 10 parts Aquagel from Baroid Division of National Lead Co. The mixture was agitated to yield a freely moving suspension and thereafter 2 parts sulfuric acid 78% were added. The resulting mixture was agitated for 2 hours at 65° C. and thereafter 188 parts of phenol were added. The agitation was continued for 4 hours, the temperature rising to 80° C. The acid clay catalyst was removed by centrifuging, and the residual liquid subjected to distillation at 10 mm. through a laboratory Vigreaux column, yielding in turn 12 parts phenol and then 376 parts diisobutylphenol distilling over the range 163–182° C. at 10 mm. and having S.P. 62° C. Yield: 91.5% of theory.

EXAMPLE II-A

In order to determine the increase in yield of the alkylated product by the process of Example II, a similar alkylation was conducted with the exception that the reactants were 224 parts of diisobutylene, 188 parts of phenol, and 10 parts of catalyst KSF. Reaction time was 4 hours at a temperature of 80° C. Distillation as in Example II gave a yield of 306 parts diisobutylphenol distilling over the range 163–182° C. and having S.P. 62° C. Yield: 74%.

EXAMPLE II-B

In order to determine further the increase in yield of the alkylated product by the process of Example I, a similar alkylation was conducted corresponding to Example II-A. In this instance the reactants were 224 parts of diisobutylene, 188 parts of phenol, and 10 parts of Aquagel (Baroid Division). Reaction time was 4 hours at a temperature of 80° C. Yield of diisobutylphenol: 2%.

EXAMPLE III

A 1-liter 3-necked flask equipped with agitator, thermometer, and a water-cooled reflux condenser was charged with 168 parts dodecene and 15 parts Premium 200 mesh bentonite from National Lead Company. The mixture was agitated to yield a freely moving suspension and thereafter 2 parts sulfuric acid 100% were added. The resulting mixture was agitated for 1½ hours at 60° C. and thereafter 324 parts of cresol were added. The agitation was continued for 5 hours, the temperature rising to 90° C. The acid clay catalyst was removed by centrifuging, and the residual liquid subjected to distillation at 10 mm. through a laboratory Vigreaux column, yielding in turn 220 parts cresol and then 256 parts dodecylcresol, distilling over the range 205–220° C. at 10 mm. and having refractive index $n_D^{25}=1.5095$. Yield: 93%.

EXAMPLE III–A

In order to determine the increase in yield of the alkylated product by the process of Example III, a similar alkylation was conducted with the exception that the reactants were 168 parts of dodecene, 324 parts of cresol, and 15 parts of catalyst KSF. Reaction time was 5 hours at a temperature of 90° C. Distillation as in Example III gave a yield of 240 parts cresol and 220 parts dodecylcresol, distilling over the range 205–220° C. at 10 mm. and having refractive index $n_D^{25}=1.5095$. Yield: 80%.

EXAMPLE III–B

In order to determine the increase in yield of the alkylated product by the process of Example III, a similar alkylation was conducted corresponding to Example III–A. In this instance the reactants were 168 parts of dodecene, 324 parts of cresol, and 15 parts of Premium 200 mesh bentonite (National Lead). Reaction time was 5 hours at a temperature of 90° C. Yield of dodecylcresol: 0%.

EXAMPLE IV

A 1-liter 3-necked flask equipped with agitator, thermometer, and a water-cooled reflux condenser was charged with 252 parts octadecene and 30 parts Zeogel (fuller's earth from National Lead Co.). The mixture was agitated to yield a freely moving suspension and thereafter 5 parts sulfuric acid 60% were added. The resulting mixture was agitated for 3 hours at 60° C. and thereafter 188 parts of phenol were added. The agitation was continued for 4 hours, the temperature rising to 90° C. The acid clay catalyst was removed by centrifuging, and the residual liquid subjected to distillation at 10 mm. through a laboratory Vigreaux column, yielding in turn 108 parts phenol and then 306 parts octadecylphenol having a refractive index $n_D^{25}=1.5010$.

EXAMPLE IV–A

In order to determine the increase in yield of the alkylated product by the process of Example IV, a similar alkylation was conducted with the exception that the reactants were 252 parts of octadecene, 188 parts of phenol, and 30 parts of catalyst KSF. Reaction time was 4 hours at a temperature of 90° C. Distillation as in Example IV gave a yield of 142 parts cresol and 261 parts octadecylphenol. Yield: 75%.

EXAMPLE IV–B

In order to determine the increase in yield of the alkylated product by the process of the foregoing Example IV, a similar alkylation was conducted corresponding to Example IV–A. In this instance the reactants were 252 parts of octadecene, 188 parts of phenol, and 30 parts of Zeogel (National Lead). Reaction time was 4 hours at a temperature of 90° C. Yield of octadecylphenol: 0%.

EXAMPLE V

A 1-liter 3-necked flask equipped with agitator, thermometer, and a water-cooled reflux condenser was charged with 252 parts of nonene and 40 parts Wyobond bentonite. The mixture was agitated to yield a freely moving suspension and thereafter 10 parts sulfuric acid 68% were added. The resulting mixture was agitated for 1 hour at 60° C. and thereafter 270 parts of cresol were added. The agitation was continued for 3 hours, the temperature rising to 100° C. The acid clay catalyst was removed by filtration and the resultant filtrate subjected to distillation at 10 mm. through a laboratory Vigreaux column, yielding in turn 60 parts cresol and then 430 parts nonylcresol, distilling over the range 165–195° C. at 10 mm. and having a refractive index $n_D^{25}=1.5110$. Yield: 92%.

EXAMPLE V–A

In order to determine the increase in yield of the alkylated product by the process of Example V, a similar alkylation was conducted with the exception that the reactants were 252 parts of nonene, 270 parts of cresol, and 40 parts of catalyst KSF. Reaction time was 3 hours at a temperature of 100° C. Distillation as in Example V gave a yield of 72 parts cresol and 388 parts nonylcresol. Yield: 83%.

EXAMPLE V–B

In order to determine the increase in yield of the alkylated product by the process of Example V, a similar alkylation was conducted corresponding to Example V–A. In this instance the reactants were 252 parts of nonene, 270 parts of cresol, and 40 parts of Wyobond bentonite. Reaction time was 3 hours at a temperature of 100° C. Yield of nonylcresol: 1.4%.

The foregoing examples were repeated while using various alkene hydrocarbons, clays, and with variations of the temperature and time of contact, and the acid activated clays obtained utilized immediately in the alkylation of phenol. The results obtained are noted in the following table:

| Alkene Hydrocarbon, Parts by Weight | Bentonite Clays of Examples I through V, Parts by Weight | Sulfuric Acid 68%, Parts by Weight | Temperature, °C. | Time, Hrs. | Percent Yield in Alkylation |
|---|---|---|---|---|---|
| Diisopropylene, 200 | Ex. I, 40 | 8 | 80 | 3 | 92 |
| n-Hexylene, 400 | Ex. II, 80 | 20 | 60 | 4 | 90 |
| α-Nonene, 300 | Ex. III, 30 | 3 | 90 | 3 | 93 |
| Tetra-iso-propylene, 200 | Ex. IV, 80 | 40 | 120 | 2 | 94 |
| Hexadecene, 600 | Ex. V, 120 | 24 | 130 | 5 | 90 |

From the foregoing results it is clearly evident that the one-step process of the present invention has many advantages. It is readily appreciated as a matter of practicality that when the alkene hydrocarbon used as the activating medium for the raw clay is the same as that employed in the alkylation of the phenolic compound, the isolation and the drying of the catalyst is completely eliminated, thereby showing a substantial saving in operational cost.

I claim:

1. The process of acid activating a silica-alumina clay in the presence of a mono-olefinic hydrocarbon and alkylating a phenolic compound with the activated clay which comprises activating for a period of time ranging from ½ to 5 hours a freely moving suspension of a raw silica-alumina clay and a mono-olefinic hydrocarbon of from 6 to 18 carbon atoms with sulfuric acid at a temperature of from ambient to the boiling point of the mono-olefinic hydrocarbon, adding to said suspension a phenolic compound and alkylating the same at a temperature of from 60° to 120° C., said phenolic compound containing from 1 to 3 benzene rings and from 1 to 3 hydroxy groups.

2. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of from 10 to 50 parts by weight of a raw silica-alumina clay and from 100 to 300 parts by weight of a mono-olefinic hydrocarbon of from 6 to 18 carbon atoms with from 1 to 50 parts by weight of sulfuric acid of from 50 to 100% concentration per 100 parts by weight of said clay at a temperature ranging from ambient to the boiling point of the mono-olefinic hydrocarbon, adding to the said suspension a phenolic compound and alkylating the same at a temperature of from 60° to 120° C., said phenolic compound containing from 1 to 3 benzene rings and from 1 to 3 hydroxy groups.

3. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of from 10 to 50 parts by weight of a raw silica-alumina clay and from 100 to 300 parts by weight of a mono-olefinic hydrocarbon of from 6 to 18 carbon atoms with from 1 to 50 parts by weight of sulfuric acid of from 50 to 100% concentration per 100 parts by weight of said clay at a temperature ranging from 20° to 100° C., adding to the said suspension a phenolic compound and alkylating the same at a temperature of from 60° to 120° C., said phenolic compound containing from 1 to 3 benzene rings and from 1 to 3 hydroxy groups.

4. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of from 10 to 50 parts by weight of a raw silica-alumina clay and from 100 to 300 parts by weight of a mono-olefinic hydrocarbon of from 6 to 18 carbon atoms with from 1 to 30 parts by weight of 100% sulfuric acid per 100 parts by weight of said clay at a temperature of from 20° to 100° C., adding to the said suspension a phenolic compound and alkylating the same at a temperature of from 60° to 120° C., said phenolic compound containing from 1 to 3 benzene rings and from 1 to 3 hydroxy groups.

5. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of 20 parts by weight of raw bentonite clay and 250 parts by weight of nonene with 1 part by weight of 60% sulfuric acid at a temperature of 60° C., adding 235 parts by weight of phenol to said suspension and alkylating the same at a temperature of about 90° C., said phenolic compound containing from 1 to 3 benzene rings and from 1 to 3 hydroxy groups.

6. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of 10 parts by weight of raw bentonite clay and 224 parts by weight of diisobutylene with 2 parts by weight of 78% sulfuric acid at a temperature of 65° C., adding 188 parts by weight of phenol to said suspension and alkylating the same at a temperature of 80° C., said phenolic compound containing from 1 to 3 benzene rings and from 1 to 3 hydroxy groups.

7. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of 15 parts by weight of raw bentonite clay and 168 parts by weight of dodecene with 2 parts by weight of 100% sulfuric acid at a temperature of 60° C., adding 324 parts by weight of cresol to said suspension and alkylating the same at a temperature of 90° C., said phenolic compound containing from 1 to 3 benzene rings and from 1 to 3 hydroxy groups.

8. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of 30 parts by weight of raw fuller's earth and 252 parts by weight of octadecene with 5 parts by weight of 60% sulfuric acid at a temperature of 60° C., adding 188 parts by weight of phenol to said suspension and alkylating the same at a temperature of 90° C., said phenolic compound containing from 1 to 3 benzene rings and from 1 to 3 hydroxy groups.

9. The process of acid activating a silica-alumina clay in the presence of a mono-olefinic hydrocarbon and alkylating a phenolic compound with the activated clay which comprises activating for a period of time ranging from ½ to 5 hours a freely moving suspension consisting of 40 parts by weight of raw bentonite clay and 252 parts by weight of nonene with 10 parts by weight of 68% sulfuric acid at a temperature of 60° C., adding 270 parts by weight of cresol to said suspension and alkylating the same at a temperature of 100° C., said phenolic compound containing from 1 to 3 benzene rings and from 1 to 3 hydroxy groups.

References Cited by the Examiner

UNITED STATES PATENTS

| | | | |
|---|---|---|---|
| 2,256,610 | 9/1941 | Buc | 260—624 |
| 2,415,069 | 2/1947 | Arvin et al. | 260—624 |
| 3,014,079 | 12/1961 | Olin | 260—624 |

LEON ZITVER, *Primary Examiner.*

CHARLES B. PARKER, H. G. MOORE, *Examiners.*

D. R. MAHANAND, W. B. LONE,
*Assistant Examiners.*